United States Patent
Johnson

(10) Patent No.: US 8,214,740 B2
(45) Date of Patent: Jul. 3, 2012

(54) SONG FLOW METHODOLOGY IN RANDOM PLAYBACK

(75) Inventor: Timothy Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 374 days.

(21) Appl. No.: 12/610,079

(22) Filed: Oct. 30, 2009

(65) Prior Publication Data

US 2011/0107213 A1    May 5, 2011

(51) Int. Cl.
G06F 3/00 (2006.01)
G11B 21/08 (2006.01)
(52) U.S. Cl. ........... 715/716; 715/825; 369/30.09
(58) Field of Classification Search ............ 715/704, 715/716, 721, 810, 825, 853–855, 866; 700/94; 369/30.08–30.09; 386/241; 713/100
See application file for complete search history.

(56) References Cited

U.S. PATENT DOCUMENTS

| | | | |
|---|---|---|---|
| 6,526,411 B1 * | 2/2003 | Ward | 1/1 |
| 6,904,004 B1 * | 6/2005 | Van der Meulen | 369/30.28 |
| 6,933,433 B1 * | 8/2005 | Porteus et al. | 84/615 |
| 7,220,910 B2 * | 5/2007 | Plastina et al. | 84/615 |
| 7,689,304 B2 * | 3/2010 | Sasaki | 700/94 |
| 7,822,318 B2 * | 10/2010 | Miller | 386/248 |
| 7,882,435 B2 * | 2/2011 | Kretz et al. | 715/716 |
| 7,937,417 B2 * | 5/2011 | Seymour | 707/805 |
| 2001/0018858 A1 | 9/2001 | Dwek | |
| 2003/0086699 A1 * | 5/2003 | Benyamin et al. | 386/96 |
| 2003/0182100 A1 | 9/2003 | Plastina et al. | |
| 2004/0220791 A1 | 11/2004 | Lamkin et al. | |

(Continued)

FOREIGN PATENT DOCUMENTS

WO    2007144030 A1    12/2007

OTHER PUBLICATIONS de Mooij, "Learning Preferences for Music Playlists", Master's Thesis, Technische Unversiteit Eindhoven, 2003.*

(Continued)

*Primary Examiner* — William Bashore
*Assistant Examiner* — Andrew Tank
(74) *Attorney, Agent, or Firm* — Kramer Levin Naftalis & Frankel LLP

(57) ABSTRACT

An electronic device can play back media items using a random playback mode. To ensure that related media items are played back in a proper order (e.g., live music is played back in concert order), the electronic device can define metadata or other data coupling related media items in a predefined or preset sequence. For example, related media items can include metadata tags identifying the previous and next media items to play back in the sequence. As another example, the electronic device can store a listing of media items of a sequence and the order in which to play them back. When the electronic device reaches a media item that is part of a preset sequence during random playback, the electronic device can identify at least the subsequent media items in the sequence, and insert the subsequent media items in the playback queue. The electronic device can then play back the entire sequence before moving to the next media item in the playback queue.

17 Claims, 3 Drawing Sheets

U.S. PATENT DOCUMENTS

| | | | |
|---|---|---|---|
| 2007/0025194 A1* | 2/2007 | Morse et al. ............... 369/30.1 |
| 2007/0053268 A1* | 3/2007 | Crandall et al. ........... 369/53.31 |
| 2007/0255752 A1* | 11/2007 | Miller ..................... 707/104.1 |
| 2008/0162358 A1 | 7/2008 | Patsiokas et al. |
| 2008/0262641 A1* | 10/2008 | You et al. .................. 700/94 |
| 2009/0063975 A1 | 3/2009 | Bull et al. |
| 2009/0070370 A1 | 3/2009 | Cunningham et al. |
| 2009/0100068 A1 | 4/2009 | Gauba et al. |
| 2009/0125609 A1 | 5/2009 | Wood et al. |
| 2009/0158155 A1 | 6/2009 | Quinn et al. |
| 2009/0222115 A1* | 9/2009 | Malcolm et al. ............ 700/94 |
| 2009/0326949 A1 | 12/2009 | Douthitt et al. |

OTHER PUBLICATIONS

Rango et al., "Inferring Similarity Between Music Objects with Application to Playlist Generation," in ACM MIR 2005, Nov. 10-11, 2005, Singapore, pp. 73-80.*

F. Maillet, D. Eck, G. Desjardins, and P. Lamere. Maillet et al., "Steerable playlist generation by learning song similarity from radio station playlists", Proceedings of the 10th International Society for Music Information Retrieval Conference, ISMIR 2009, Kobe International Conference Center, Kobe, Japan, Oct. 26-30, 2009, pp. 345-350.*

* cited by examiner

SONG FLOW METHODOLOGY IN RANDOM PLAYBACK

BACKGROUND OF THE INVENTION

This is directed to systems and methods for managing the order of played back media items within a random playback sequence. In particular, this is directed to playing back a subset of media items in a predefined sequence during random playback of media items.

Many types of electronic devices include circuitry and software for playing back media items. For example, portable media devices can be used to play back locally stored media items selected from a user's media library. The device can play back the media items in any suitable order, including for example in a user set order (e.g., set by a playlist), by ordering the media items based on a metadata attribute value (e.g., alphabetically by title or artist name). Alternatively, the device can play back media items in a random order.

While many media items can be played back in any random order, some media items or some sets of media items are best played back in a specific order. For example, some album songs are best played back in album order. As another example, a series of live songs or songs recorded at a concert may be best played back in concert order. When the media items are inserted in a random playlist, the resulting playback may not be enjoyable to the user. In particular, the user may not be able to listen to an entire sequence of media items within the random playback of the media items.

SUMMARY OF THE INVENTION

This is directed to systems and methods for defining sequences of media items that are played back in sequence order during random playback. In particular, this is directed to identifying media items that are part of a sequence during random playback, and playing back the entire sequence in order instead of the single media item.

An electronic device can play back media items in any suitable order. In some embodiments, a user can define one or more playlists specifying both media items and an order in which to play the media items. Alternatively, a user can select a set of media items to play back in a random order. For example, the user can select a "shuffle" or "random" playback option for playing back an entire media library, media items by a particular artist, in a particular album, or in a particular genre, or media items in a playlist.

Some related media items, however, may be best played back in a predetermined sequence. For example, media items corresponding to live music pieces may be best played back in the order in which they were played live. In particular, crowd noises and band comments between songs may only make sense or increase the overall listenability or appeal of live music when it is played in the proper order. In some embodiments, an artist may order songs in an album such that there is a logical progression between songs. A user may then wish to listen to several or all of the songs in the album in album order within a random or shuffled media play back mode.

To ensure that related media items are played back in a proper order in a random playback mode, the electronic device can define metadata or other data coupling related media items in a predefined or preset sequence. For example, related media items can include metadata tags identifying the previous and next media items to play back in the sequence. As another example, the electronic device can store a listing of media items of a sequence and the order in which to play them back. When the electronic device reaches a media item that is part of a preset sequence during random playback, the electronic device can identify at least the subsequent media items in the sequence, and insert the subsequent media items in the playback queue. In some embodiments, the electronic device can instead or in addition identify the first media item of the preset sequence, and replace the media item with the first item of the sequence. The electronic device can then play back the entire sequence before moving to the next media item in the playback queue.

In response to receiving, during playback of a media item that is part of a sequence, an instruction to skip to the next item, the electronic device can skip to the next item of the sequence. Alternatively, the electronic device can instead skip to the end of the sequence and play back the next item in the playback queue. Similarly, in response to an instruction to skip to a previous item, the electronic device can skip to the beginning of the currently played back media item, immediately preceding media item in the sequence, the first media item of the sequence, or the last media item played back before the sequence.

A user can define sequences of media items using any suitable approach. In some embodiments, sequences can be defined by default based on attributes or metadata associated with media items. For example, media items associated with a "live" or "unplugged" tag can be incorporated within a sequence. The sequence order can be determined, for example, from track numbers associated with the media items. Alternatively, a user can select particular media items and an order in which to play back the media items within a sequence. As still another example, a media provider can define sequences of media items provided by the provider (e.g., an artist can define a sequence of songs that the artist believes should be heard in sequence).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to playing back particular sets of media items in a sequence while in random or shuffle playback mode. In particular, this is directed to re-ordering shuffled or randomly played back media items to ensure that preset sequences of media items are played back in order.

Figure 1:
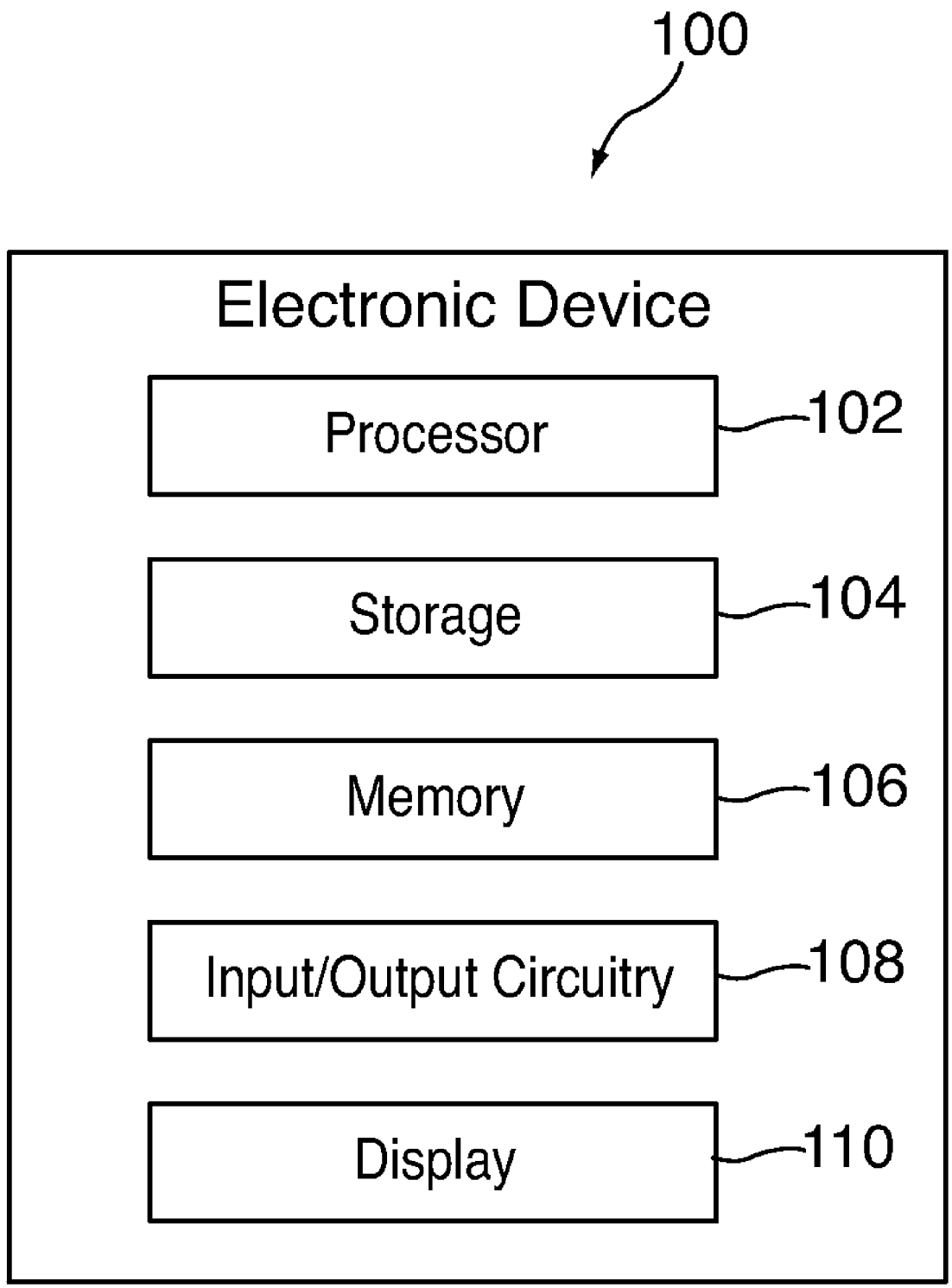
FIG. 1 is a schematic view of an illustrative electronic device for playing back media in accordance with one embodiment of the invention.

FIG. 1 is a schematic view of an illustrative electronic device for playing back media in accordance with one embodiment of the invention. Electronic device 100 can include any suitable type of electronic device operative to display information to a user while detecting movement of the device. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., a navigation system (e.g., portable or coupled to a vehicle), pocket-sized personal computers, personal digital assistants (PDAs), a laptop computer, a music recorder, a video recorder, a camera, radios, medical equipment, and any other portable electronic device capable of being moved by the user.

Electronic device 100 can include a processor or control circuitry 102, storage 104, memory 106 input/output circuitry 108, and display 110, as typically found in an electronic device of the type of electronic device 100. In some embodiments, one or more of electronic device components 100 can be combined or omitted (e.g., combine storage 104 and memory 106), or electronic device 100 can include other components not combined or included in those shown in FIG. 1 (e.g., positioning circuitry, communications circuitry, or motion detection circuitry), or several instances of the components shown in FIG. 1. For the sake of simplicity, only one of each of the components is shown in FIG. 1. Electronic device 100 can include computer readable media having computer readable instructions recorded thereon for performing electronic device operations.

Figure 2:
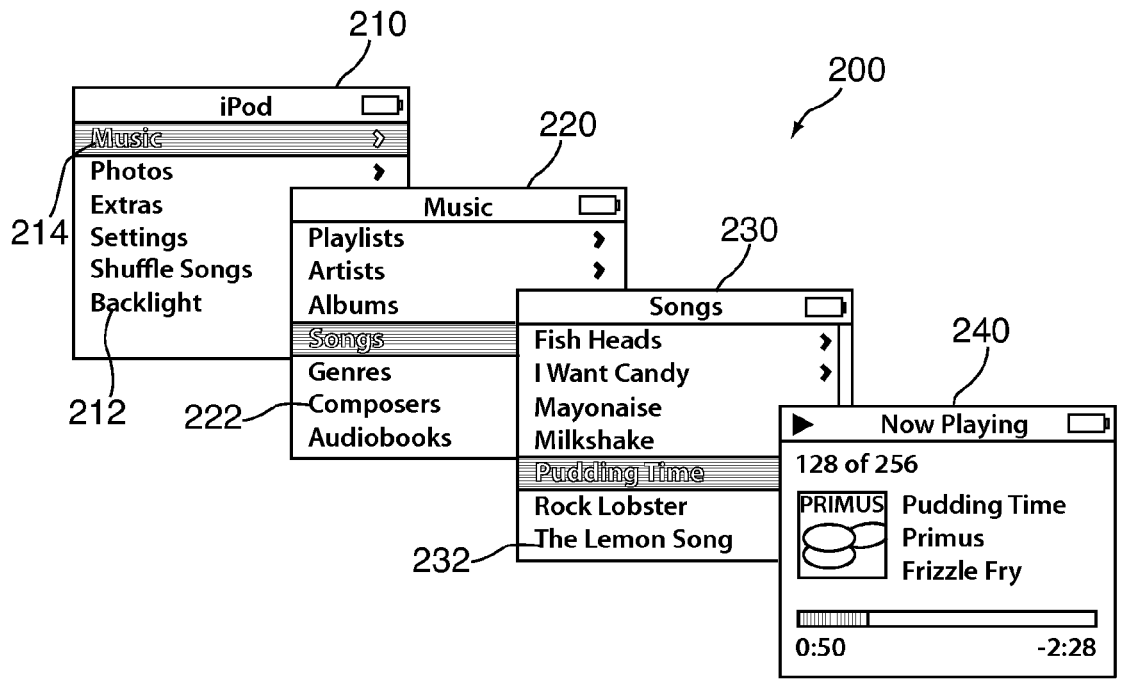
FIG. 2 is a schematic view of a sequence of illustrative interfaces for selecting media items to play back in accordance with one embodiment of the invention.

Using an electronic device, a user can play back locally stored or remotely accessed media items. For example, the user can synch the electronic device to a host device from which particular media items can be selected and locally stored. The electronic device circuitry can play back the media items and output the corresponding audio to the user via audio output circuitry (e.g., headphones or speakers). The user can select which media items to play back using any suitable approach. FIG. 2 is a schematic view of a sequence of illustrative interfaces for selecting media items to play back in accordance with one embodiment of the invention. Display 200 can include a sequence of menus 210, 220, 230 and 240 for navigating available media items and selecting a particular media item for playback. As the user navigates highlight region 214 in each of listings 212, 222 and 232 and provides a selection instruction, the electronic device can display the subsequent menu and listing. Using the menu navigation scheme, a user can select one or more particular media items to play back. In the particular example of FIG. 2, the user may select a particular song to play back. The user, however, may also select a collection of songs to playback, such as an album, playlist, genre, or other collection.

The user can direct the electronic device to play back a collection of media items in any suitable manner. In some cases, a user can play back the media items sequentially (e.g., in the order of the media items in the collection), or in a random or shuffled order. In some cases, an electronic device can include a sequence or collection of media items that are best played in a particular order. For example, media items from live concerts may have a specific order that is indicated by crowd noises or band comments, and may not make sense when played back individually or in an incorrect order. As another example, some content providers or content creators may feel that their music is best played back in album order, and not in an arbitrary order or as individual tracks. When media items are played back in random order, however, a particular sequence may not be played back in the proper order.

Figure 3:
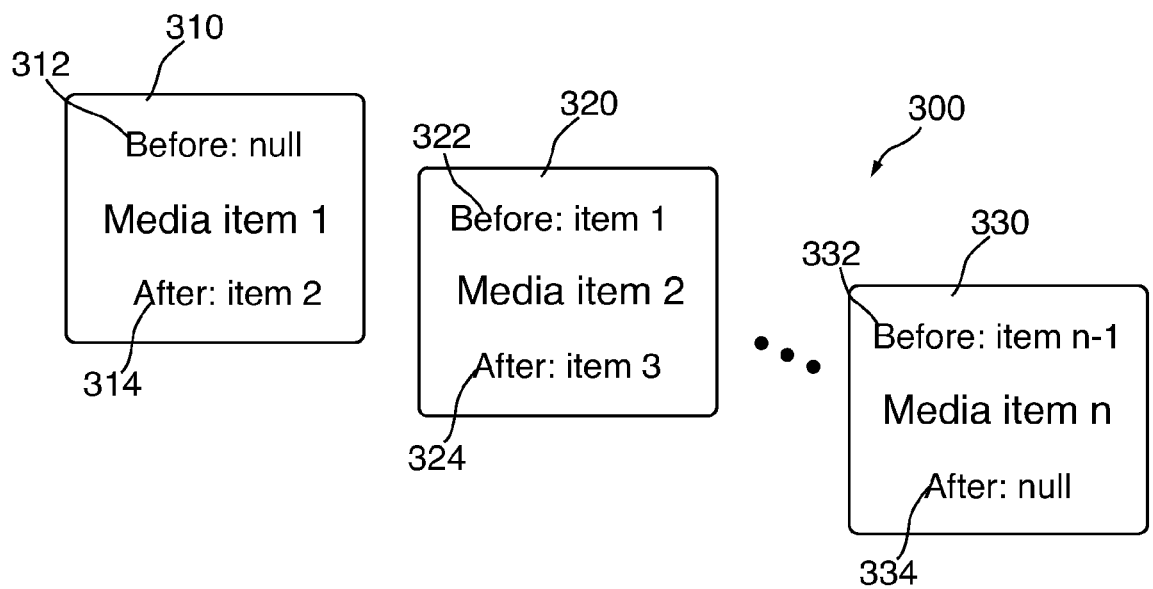
FIG. 3 is a schematic view of an illustrative data structure for defining a media item sequence in accordance with one embodiment of the invention.

In some cases, a user or content provider may wish to ensure that particular sequences of content are played back sequentially in a predetermined order, even if the device is in a random or shuffle playback mode. The electronic device can associate different media items in a sequence using any suitable approach. In some embodiments, the electronic device can maintain a master list or schedule of all media item sequences. Alternatively or in addition, the media items within a sequence can include metadata identifying them as part of a sequence. FIG. 3 is a schematic view of an illustrative data structure for defining a media item sequence in accordance with one embodiment of the invention. Structure 300 can include several media items 310, 320 and 330, identified by the tags "Media Item 1," "Media Item 2," and "Media Item N." Structure 300 can include any suitable number of media items, including for example two or as many as are locally stored or accessible to the device. Each media item can include different metadata tags specifying characteristics of the media item. In addition, each media item can include tags for defining the previous media item and next media item in the sequence. For example, media item 310 can include previous and next tags 312 and 314, media item 320 can include previous and next tags 322 and 324, and item 330 can include previous and next tags 332 and 334, where "null" tags 312 and 334 define the beginning and end of the sequence. This may form a linked list of media items that define the particular media items and playback order for the sequence. When the electronic device selects one of the media items of the sequence for playback in a random playback mode, the electronic device can navigate the linked list in both directions to identify the entire sequence, and replace the one of the media items with some or all of the sequence.

The electronic device can include one or more "shuffle" modes. In one implementation, the electronic device can include a general "shuffle" mode that may or may not respect the sequences of media items. For example, in a first implementation the general "shuffle" mode can ignore linked lists or other metadata defining sequences of media items. The electronic device can also include other "shuffle" modes, such as for example a "shuffle (album)" mode. In this mode, the electronic device can replace a song in a shuffled playback sequence with the entire album or collection corresponding to the song. Each album can be played back only once, and media items within the album can be played back in album order or in a shuffled order (e.g., with or without independent sequences within the album). For example, the electronic device can include the album "The Dark Side of the Moon" by Pink Floyd, which includes the tracks Money, Brain Damage, Speak to Me/Breath, Eclipse, The Great Gig in the Sky, On the Run, Any Color You Like, Us and Them, Time, and Dark Side of the Moon. When shuffling songs in the "shuffle (album)" mode and "Eclipse" is identified in the playback queue, then the entire album, "Money" through the "Dark Side of the Moon" is played back.

In some embodiments, the electronic device can include a "shuffle (live)" mode in which media items having a "live" tag or other sequence-related tags can be replaced with the entire sequence For example, the electronic device can include a recording of a concert by the Grateful dead on Jun. 25, 1992. The set list can include the tracks "All along the Watchtower, Big River, Brown Eyed Women, Drums, Good Morning Little Schoolgirl," where the tracks "All along the Watchtower" and "Big River" are linked in a sequence, and the tracks "Drums" and "Good Morning Little Schoolgirl" are linked in a sequence. In the "shuffle (live)" mode, when the electronic device reaches the track "Drums," the electronic device can insert the track "Good Morning Little Schoolgirl" in the playback sequence. In the "shuffle (album)" mode, when the electronic device reaches the track "Drums," the electronic device can play back the entire concert set, from "All along the Watchtower to Good Morning Little Schoolgirl." Other variations of the "shuffle" mode could also be used, such as for example "shuffle (artist)," "shuffle (genre)," "shuffle (year)," or any other shuffle mode based on a metadata tag or value of media items.

Other data structures can be used instead of or in addition to structure 300. For example, each media item can include metadata defining the entire sequence in which the media item is included. In some cases, a particular media item can be part of several sequences. The media item can then include metadata defining each of the sequences, as well as information specifying when to use each of the sequences. For example, the media item can include a variable defining the last used sequence or next sequence to use when the media item is selected for playback in a random playback mode. If the media item was identified based on another media item in the sequence (e.g., following the links of a linked list), the electronic device can select the sequence corresponding to the other media item. For example, if a media item is part of sequences A and B, and the device reaches the media item by following the links of sequence A from an earlier media item of sequence A, the device then selects the media item of sequence A following the reached media item.

A particular sequence of media items can be defined using any suitable approach. In some embodiments, the electronic device can automatically define a sequence based on common attributes of media items. For example, media items tagged with a "live" tag or identified as being concert recordings can be automatically placed in a sequence (e.g., media items with the characters "->" in the title or other tags of the media items), for example based on a track number or on the actual characters used to provide the indication that the track is live. In particular, as live media items are imported by the electronic device in a media playback application, the application could detect tags of the media items and establish the sequences in a database (ahead of media playback). For example, a user can select an option (e.g., a checkbox in a preferences menu) for analyzing the imported songs as they are imported rather than when they are played back. In some embodiments, a user can define a sequence. For example, a user can select two or more media items, order them in a particular manner, and group the media items in a particular sequence. In response to the user instruction, the electronic device can apply or modify metadata associated with the media items to define the sequence. For example, a user can select two studio-recorded media items that the user likes to listen back to back, and define a sequence for the two media items. In some embodiments, a content generator or creator can define sequences of content. For example, an artist can define a sequence that includes some or all songs on an album in album order, for example to ensure that a particular artistic vision is maintained. The media items can be provided from the content provider with metadata or other data that defines one or more sequences.

During random playback, an electronic device can re-order a collection of media item and play back the collection in the random or shuffled order. When one of the media items is part of a sequence, however, the electronic device can revise the playback order to maintain the sequence. The electronic device can adjust the playback order using any suitable approach. In some embodiments, the electronic device can define a shuffled or random playback order for all of the media items in a particular collection upon receiving an instruction to play back the collection (e.g., a shuffled playback queue or playlist). In such cases, the electronic device can scan the generated random playlist, and identify particular media items that are part of a sequence. If the electronic device identifies a media item that is part of a sequence (e.g., a media item with a sequence tag, such as tags 312 and 314, FIG. 3), the electronic device can identify the other media items that are part of the sequence, and replace the identified media item with the part of or the entire sequence. For example, the electronic device can replace the media item with the entire sequence (e.g., starting with the first song in the sequence), or instead begin the sequence with the identified media item and insert the next media items of the sequence in the playback queue or playlist (e.g., such that the identified media item is played back when selected, but the following media items are the rest of the preset sequence). In some cases, the electronic device can identify and remove from the random playlist the other media items of the sequence, as they have in effect been moved to be part of the sequence. Alternatively, the other media items in the random playlist that are part of the sequence can be left in the playlist, and later replaced in turn with part of or the entire sequence.

In some embodiments, the electronic device can instead or in addition identify the next media item to play back in a random or shuffle mode when or just prior to when the next media item is to be played back (e.g., when the preceding media item playback ends, or in response to receiving a user instruction to skip to the next item). For example, the playback queue may have a limited number of media items, and only get additional media items as the playback queue decreases. Before playing back the next identified media item in the queue, the electronic device can determine whether the next item is part of a preset sequence. If the electronic device determines that the next media item is part of a sequence, the device can first identify the other media items that are part of the sequence, and the sequence order of the media items. The electronic device can then place part or all of the sequence in the playback queue instead of the media item. In some cases, the electronic device can leave the media item next in the playback queue, but insert the next media items of the sequence in the playback queue.

In some cases, all of the media items in a particular sequence may not be included in the initial collection of media items for which random playback was selected (e.g., media items of a sequence are not by an artist whose songs are being played back). In some cases, however, all of the media items of the sequence may be available to the electronic device (e.g., the media items of the sequence are locally stored on the device). The electronic device can then retrieve the missing media items of the preset sequence and play back the sequence in its entirety, play back only the media items of the sequence that are in the initial collection, or play back only the media item (e.g., ignore the sequence). If the media items of the sequence are not available to the device (e.g., not locally stored), the electronic device can instead or in addition play back the sequence with only the available media items.

In some embodiments, a user may wish to control media playback as a preset sequence is played back. For example, a user may wish to skip forward or back between media items. The electronic device can skip forward or backward through media items of a preset sequence using any suitable approach. In some embodiments, the electronic device can skip to the next or previous media item within the sequence. Alternatively, the electronic device can skip to the next media item following the sequence, or to the first media item of the sequence or the media item played back immediately prior to the sequence.

Figure 4:
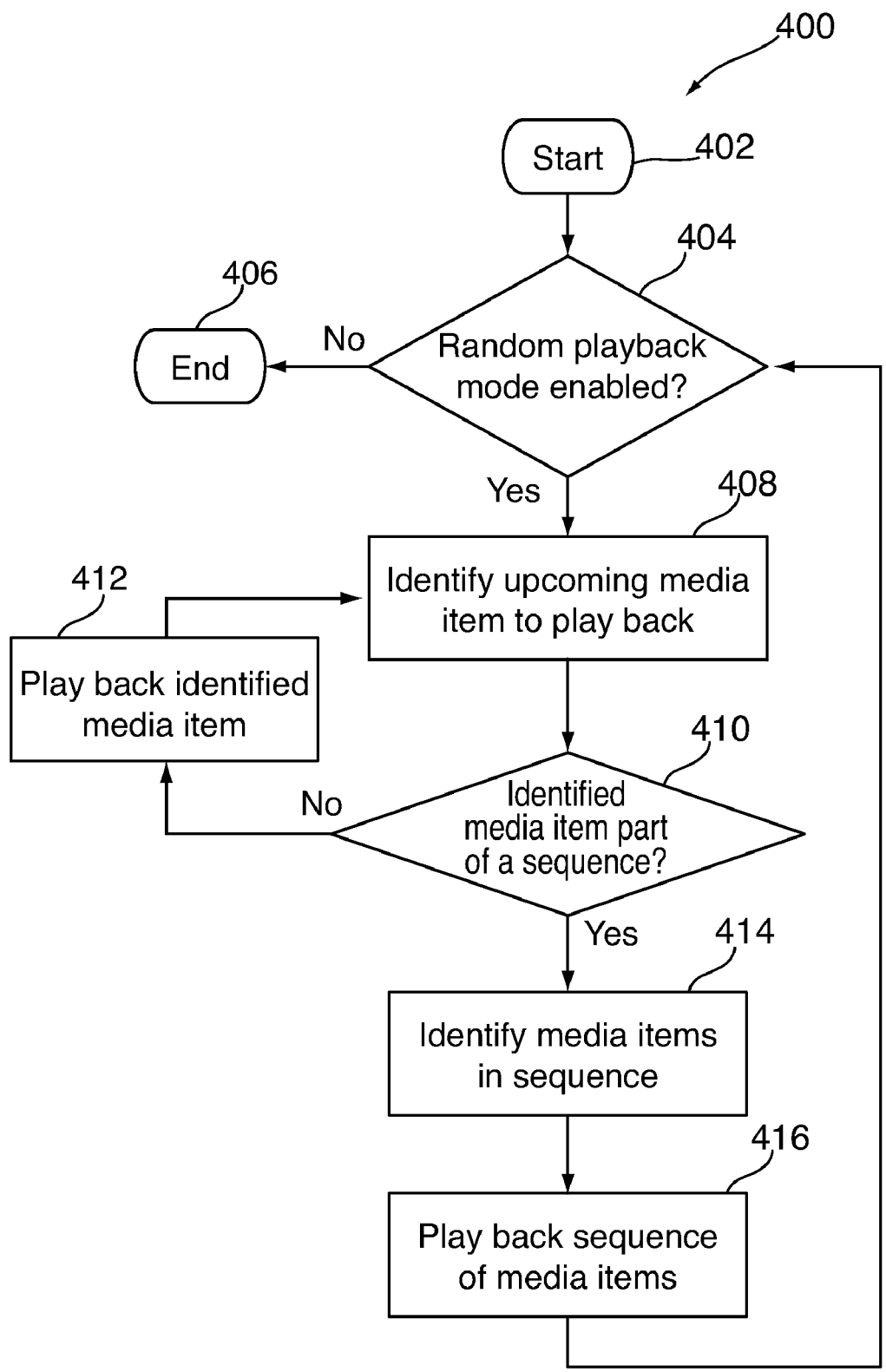
FIG. 4 is a flowchart of an illustrative process for playing back sequences of media items in accordance with one embodiment of the invention.

FIG. 4 is a flowchart of an illustrative process for playing back sequences of media items in accordance with one embodiment of the invention. Process 400 can begin at step 402. At step 404, the electronic device can determine whether a random playback mode is enabled. For example, the electronic device can determine whether media items selected for playback are played back in number order or are shuffled before playback. If the electronic device determines that the random playback mode is not enabled, process 400 can move to step 406 and end.

If, at step 404, the electronic device instead determines that the random playback mode is enabled, process 400 can move to step 408. At step 408, the electronic device can identify the next media item to play back. For example, the electronic device can identify the upcoming media item in a randomly generated playback queue. At step 410, the electronic device can determine whether the identified upcoming media item is part of a preset sequence. For example, the electronic device can determine whether the identified media item is in a database or listing of known present sequences. As another example, the electronic device can review metadata associated with the identified media item and determine whether there is metadata associated with a sequence (e.g., metadata identifying previous or next media items in the sequence). If the electronic device determines that the identified media item is not part of a sequence, process 400 can move to step 412. At step 412, the electronic device can play back the identified media item. Process 400 can then return to step 408 and identify the next media item to play back.

If, at step 410, the electronic device instead determines that the identified media item is part of a sequence, process 400 can move to step 414. At step 414, the electronic device can identify the media items in the preset sequence. For example, the electronic device can identify the media items from the metadata associated with the identified upcoming media item (e.g., via a linked list of metadata identifying the media items of the sequence). As another example, the electronic device can identify media items in a sequence from a listing of sequence media items. At step 416, the electronic device can play back the sequence of media items. For example, the electronic device can play back the media items of the sequence in sequence order instead of the identified upcoming media item. Process 400 can then return to step 404 and determine whether random playback is still enabled.

In some embodiments, process 400 can instead or in addition review an entire random playback queue at step 408. For example, the electronic device can identify all media items of the playback queue that are associated with preset sequences, and replace the identified media items with the corresponding sequences. In some cases, each preset sequence may be played back a single time in the random playback queue.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation, and the present invention is limited only by the claims which follow.

What is claimed is:

1. A computer-implemented method for playing back media items, comprising:
   detecting a random playback mode;
   defining a random playback queue in which media items are arbitrarily ordered;
   identifying a media item in the random playback queue that is associated with a preset playback sequence;
   retrieving at least one other media item of the preset playback sequence;
   introducing the retrieved at least one other media item in the playback queue, wherein the identified media item and the retrieved at least one media item are ordered according to the preset playback sequence;
   identifying another media item in the random playback queue that is associated with the preset playback sequence; and
   reordering the identified another media item in the random playback queue, wherein the identified media item and the reordered another media item are ordered according to the preset playback sequence in the random playback queue.

2. The method of claim 1, further comprising:
   selecting a subset of available media items for playback; and
   wherein defining a random playback queue further comprises defining a random playback queue including only the selected subset of available media items.

3. The method of claim 2, further comprising:
   identifying the media items of the preset playback sequence that are part of the selected subset; and
   wherein introducing further comprises introducing the identified media items of the preset playback sequence that are part of the selected subset in the random playback queue in the preset sequence order.

4. The method of claim 2, further comprising:
   retrieving media items from the preset playback sequence that are not in the selected subset of media items; and
   introducing the retrieved media items that are not in the selected subset in the random playback queue to complete the preset playback sequence.

5. The method of claim 1, further comprising:
   retrieving all of the media items of the preset playback sequence; and
   inserting the media items of the entire preset playback sequence in the random playback queue instead of the identified media item.

6. The method of claim 1, further comprising:
   retrieving the media items of the preset playback sequence that follow the identified media item; and
   inserting the retrieved media items of the preset playback sequence following the identified media item in the random playback queue after the identified media item.

7. An electronic device for playing back media items, comprising output circuitry and control circuitry, the control circuitry operative to:
   enable a shuffle playback mode;
   define a shuffled playlist in which media items are played back in an arbitrary order;

identify at least two media items in the shuffled playlist that are part of a predefined sequence; and reorder the identified at least two media items in the shuffled playlist such that the at least two media items are played back in the order defined by the predefined sequence.

8. The electronic device of claim 7, wherein the control circuitry is further operative to:

identify all of the media items in the shuffled playlist that are a part of the predefined sequence; and reorder all of the identified media items such that the predefined sequence is played back in order in its entirety within the shuffled playlist.

9. The electronic device of claim 8, wherein the control circuitry is further operative to:

determine that at least one media item of the predefined sequence is not in the shuffled playlist;

retrieve the missing at least one media item; and add the retrieved missing at least one media item in the shuffled playlist in a position defined by the predefined sequence.

10. The electronic device of claim 7, wherein the control circuitry is further operative to:

play back a media item within the shuffled playlist that is part of the predefined sequence;

receive an instruction to skip playback forward; and skip playback to the next media item of the predefined sequence.

11. The electronic device of claim 7, wherein the control circuitry is further operative to:

play back a media item within the shuffled playlist that is part of the predefined sequence;

receive an instruction to skip playback forward; and skip playback to the next media item in the shuffled playlist after the predefined sequence.

12. The electronic device of claim 7, wherein:

the at least two media items that are part of the predefined sequence comprise recordings of live music.

13. The electronic device of claim 7, wherein the control circuitry is further operative to:

review metadata associated with each media item of the shuffled playlist; and identify media items of the shuffled playlist having metadata associated with a particular sequence.

14. The electronic device of claim 13, wherein the control circuitry is further operative to:

identify metadata defining at least one of a previous and next media item in the particular sequence.

15. Computer readable media for playing back media items, comprising computer-readable instructions for:

detecting a random playback mode;

defining a random playback queue in which media items are arbitrarily ordered;

identifying a media item in the random playback queue that is associated with a preset playback sequence;

retrieving at least one other media item of the preset playback sequence;

introducing the retrieved at least one other media item in the playback queue, wherein the identified media item and the retrieved at least one media item are ordered according to the preset sequence;

identifying another media item in the random playback queue that is associated with the preset playback sequence; and reordering the identified another media item in the random playback queue such that the identified media item and the identified another media item are ordered according to the preset playback sequence.

16. The computer readable media of claim 15, further comprising additional computer-readable instructions for:

selecting a subset of available media items for playback; and wherein defining a random playback queue further comprises defining a random playback queue including only the selected subset of available media items.

17. The computer readable media of claim 15, further comprising additional computer-readable instructions for:

retrieving at least one other media item of the preset playback sequence; and introducing the retrieved at least one other media item in the random playback queue such that the identified media item and the retrieved at least one media item are ordered according to the preset playback sequence within the random playback queue.

* * * * *